United States Patent [19]

Gartner et al.

[11] Patent Number: 5,102,467
[45] Date of Patent: Apr. 7, 1992

US005102467A

[54] NOVEL CEMENT ADDITIVES AND HYDRAULIC CEMENT MIXES CONTAINING THEM

[75] Inventors: Ellis M. Gartner, Silver Spring; Robert P. Kreh, Jessup, both of Md.

[73] Assignee: W.R. Grace & Co.-Conn., New York, N.Y.

[21] Appl. No.: 732,872

[22] Filed: Jul. 19, 1991

[51] Int. Cl.$^5$ .................... C04B 26/26; C04B 7/02; C08K 3/00
[52] U.S. Cl. .................... 106/727; 106/713; 106/724; 106/808; 106/810; 523/400; 523/401; 524/2; 524/6
[58] Field of Search ............... 106/696, 724, 725, 727, 106/728, 802, 808, 809, 810; 523/400, 401, 402; 524/2, 4, 6

[56] References Cited

U.S. PATENT DOCUMENTS 4,391,645 7/1983 Marcellis et al. .................... 106/90
4,457,874 7/1984 Papalos et al. .................. 260/512 C Primary Examiner—William R. Dixon, Jr.
Assistant Examiner—Michael Marcheschi
Attorney, Agent, or Firm—Howard J. Troffkin

[57] ABSTRACT

A hydraulic cement admixture capable of enhancing the latter stage set strength of the cured composition comprising certain mono- and disubstituted (dialkanolaminomethyl) phenols.

8 Claims, No Drawings

NOVEL CEMENT ADDITIVES AND HYDRAULIC CEMENT MIXES CONTAINING THEM

BACKGROUND OF THE INVENTION

The present invention relates to a hydraulic cement admixture capable of enhancing the latter stage set strength of the resultant cured composition.

The term cement is used to designate many different kinds of materials useful as binders or adhesives. Hydraulic cements are powdered materials which, when mixed with water, form a "paste" that hardens slowly. If further mixed with fine aggregate (e.g. sand), it forms a "mortar", and if mixed with fine and coarse aggregate (e.g. sand and stone) it forms a "concrete," which are rock-hard products. These products are commonly referred to as hydraulic cement compositions or mixes. These compositions are commonly formed from Portland cement (conforms to ASTM C-150), blended cements (having large amounts of slags, pozzolanic materials and the like) as well as other hydratable cements.

Various additives have been used in hydraulic cement compositions to alter mixing, curing or hardened properties. Thus, lignin sulfonates and naphthalene sulfonate-formaldehyde condensates have been used to increase the fluidity of hydraulic cement compositions to which water has been admixed. Cellulosic polymers and bentonite clay have been used to control sedimentation of particles in pastes and mortar compositions. Fumed silica has been used as an additive to make stronger concrete with reduced permeability. Inorganic salts such as metal chlorides (e.g. sodium chloride, potassium chloride) and nitrites (e.g. calcium nitrite) are added to accelerate the set of the concrete mass. Various lower alkanolamines such as monoethanolamine, diethanolamine and triethanolamine and the like, have been used as set accelerators. Trialkanolamines of higher content have been found to increase later age compressive strength of certain cement compositions having high $C_4AF$ content.

It is desired to have materials which can be added to hydraulic cement compositions in low dosages to achieve enhanced later age set strength.

SUMMARY OF THE INVENTION

The present invention is directed to the use of (dialkanol)aminoalkyl substituted phenols as an admixture to enhance the set strength of cement compositions. The subject admixtures are useful in very low dosages and do not affect the initial properties of the fluid mix.

DETAILED DESCRIPTION

The present invention is directed to the use of certain (dialkanol)aminoalkyl phenols as admixtures to enhance later age strength of hydraulic cement compositions and to hydraulic cements containing same.

The present invention is directed to a strength enhancing additive which does not cause set acceleration or early (1 day) set strength enhancement but provides enhanced 7 and 28 day compressive strength of cement compositions. The additive of the present invention is comprised of at least one phenolic compound having at least one (dialkanol)aminoalkyl group bonded in the ortho and/or para position of the phenolic ring. These compounds are represented by the general formula.

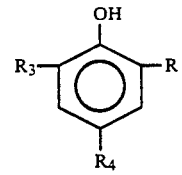

wherein R represents a (dialkanol)aminomethyl group ($-CH_2NR_1R_2$) in which each $R_1$ and $R_2$ each represents a $C_2$-$C_5$ hydroxyalkyl group such as hydroxyethyl, 2-hydroxypropyl, 3-hydroxypropyl, 2-hydroxypentyl and the like; $R_3$ represents hydrogen, hydroxyl, or R as defined above; and $R_4$ represents hydrogen, R as defined above, hydroxy, sulfonyl (as free sulfonic acid group or as alkali or alkaline earth metal salt) or a $C_1$-$C_3$ alkyl group or a $C_1$-$C_3$ alkoxy (RO) or a nitro group. The most preferred compounds for use as cement admixtures are the mono and disubstituted (dialkanol)aminomethyl derivatives of p-phenolsulfonic acid and salts and mixtures thereof.

The subject admixtures are readily formed by aminomethylation of substituted phenols with a dialkanolamine and formaldehyde. Substitution occurs in the ortho and para positions of the ring. The reaction utilizes readily available reagents and is conducted in an aqueous solution at elevated temperatures of from about 40° C. to reflux conditions. Higher temperatures (up to about 200° C.) may be used to accelerate the rate of reaction but such temperatures require pressurized conditions as is well known to those skilled in the art.

The product produced by the aminomethylation may be a single compound such as where the phenolic reactant already contains groups in the para and, preferably, also in one ortho position. Where the phenolic reactant has more than one free ortho/para position, the product may be a mixture of mono, di and tri-substituted products, as appropriate. The resultant product mixture can be directly used as a cement admixture.

The above-described phenolic compounds and mixtures thereof have unexpectedly been found to be an effective admixture product which enhances the compressive strength of hydraulic cement compositions at their latter stages of set (at 7 and 28 days) without adversely influencing the flow, initial set time or air content of the composition. The subject phenolic admixture is effective in dosages of from about 0.001 to 0.5 percent by weight, preferably from about 0.01 to 0.2 percent by weight, based on the weight of hydraulic cement solid. The particular dosage will depend upon the specific phenolic compound or mixture to be used and the degree of enhancement desired. The dosage can be readily determined by routine experimentation prior to industrial application. The admixture can be added to the cement composition as a neat material to a dry hydraulic cement. Alternately, the admixture can be added as an aqueous solution as part of the water of hydration or as a separate admixture or as part of other admixtures while forming a hydraulic cement composition. The admixture can be added at any convenient time prior to placement of the cement composition (e.g. during initial mixing of the components or mixing of components with water of hydration).

The following examples are given for illustrative purposes only and are not meant to be a limitation on the claimed invention, as appended hereto. All parts are by weight unless otherwise stated.

EXAMPLE 1

23.2 parts of p-phenolsulfonic acid monosodium salt dihydrate were dissolved in 50 parts of water to which 15 parts of 30% aqueous sodium hydroxide were added followed by the addition of a separately formed aqueous solution of 21.3 parts diethanolamine in 50 parts water. To the resultant solution 16.2 parts of 37% formalin was added. The mixture was stirred and maintained at 65°-°70° C. for 6 hours. The mixture was cooled, neutralized with HCl to a pH of 7 and the water was removed by evaporation under vacuum at 65° C. The resultant viscous liquid was decolorized with charcoal and taken up in ethanol, filtered and reconcentrated under vacuum.

The resultant light yellow viscous product was analyzed by Nuclear Magnetic Resonance spectroscopy and shown to be a mixture (1:2:1) of p-phenol sulfonic acid sodium salt, o,o-bis[(diethanol)aminomethyl]-p-phenolsulfonic acid salt and o-(diethanol)aminomethyl-p-phenolsulfonic acid salt, respectively.

The product, o,o-bis [di(hydroxyethyl)aminomethyl]-p-phenolsulfonic acid salt, was characterized by proton magnetic resonance spectrum in $D_2O$ at pH 7.8 as having a singlets at 7.63 ppm (parts per million) and 4.37 ppm and multiplets at 3.89 ppm and 3.25 ppm. The other product, o-di(hydroxyethyl)aminomethyl-p-phenolsulfonic acid salt, was characterized by proton magnetic resonance spectrum in $D_2O$ at pH 7.8 as having a singlet at 4.27 and multiplets at 7.60 ppm, 6.75 ppm, 3.89 ppm and 3.25 ppm. The reference $H_2O$ peak was at 4.80 ppm.

EXAMPLE 2

28.6 parts of a 65% aqueous solution of p-phenolsulfonic acid were mixed with 23 parts of diethanolamine (reagent grade) and 16 parts of 37% formalin. The mixture was refluxed at about 75° C. for 5 hours and then concentrated at the same temperature by vacuum evaporation. The resulting product was a light amber oil having similar NMR to the product of Example 1 above.

EXAMPLE 3

The procedure of Example 2 above was repeated except that 9.4 parts of phenol in 15 parts water was used in lieu of the 65% p-phenolsulfonic acid solution. The product (37 parts) was a yellow viscous oil.

EXAMPLE 4

The procedure of Example 2 above was repeated using 11.4 parts of 1,4-dihydroxybenzene-2-sulfonic acid monopotassium salt in 20 parts water, 11.5 parts diethanolamine and 8 parts of 37% formalin. The product (28 parts) was a dark brown viscous oil.

EXAMPLE 5

The procedure of Example 2 above was repeated using 11.6 parts of p-phenolsulfonic acid sodium salt in 20 parts water, 14.6 parts of reagent grade diisopropanolamine in 11 parts water, and 8 parts of 37% formalin. The resultant product was an amber colored oil.

The product, O-O-bis [(diisopropanol)aminomethyl]-p-phenolsulfonic acid salt, was characterized by a proton magentic resonance spectrum in $D_2O$ at pH 9.8 as having a singlet at 7.56 ppm and multiplets at 4.10 ppm, 2.82 ppm and 1.18 ppm. The reference $H_2O$ peak was at 4.81 ppm.

EXAMPLE 6

The products formed according to Examples 1-5 above were each used as an admixture. Portland cement mortar tests were conducted according to the procedure of ASTM C-109. The mortar had a water to cement ratio of 0.485. The water used had a known amount of each of the products dissolved therein. The dosage of admixture in each sample was 0.03 percent based on the cement content. Each sample was analyzed for percent flow, air content, time to set and compressive strength over time. The results given in Table I below show that the formed products imparted improved 7 and 28 day compressive strength without significantly influencing flow, set time or air content of the mortar samples.

TABLE I

| Ex. No. of Admixture | Time of Set (hrs) | Flow % | Air % | Compressive strength (psi) | | |
|---|---|---|---|---|---|---|
| | | | | 1 day | 7 days | 28 days |
| None (Blank) | 6.6 | 131 | 10.2 | 1858 | 5910 | 8074 |
| 1 | 7.4 | 139 | 10.2 | 2010 | 6380 | 8970 |
| 2 | 7.1 | 136 | 10.5 | 1950 | 6520 | 8540 |
| 3 | 7.5 | 142 | 12.6 | 1850 | 6270 | 8250 |
| 4 | 6.9 | 138 | 10.8 | 1700 | 5810 | 8140 |

EXAMPLE 7

A sample was made according to ASTM-C109 in the same manner as described above except that the product of Example 1 was used in dosage of 0.2 percent. The results are:

TABLE II

| Ex. No. of Admixture | Time of Set (hrs) | Flow % | Air % | Compressive strength (psi) | | |
|---|---|---|---|---|---|---|
| | | | | 1 day | 7 days | 28 days |
| None | 4.4 | 127 | 5.8 | 2000 | 4740 | 6510 |
| 1 | 7.3 | 126 | 6.5 | 1870 | 5710 | 7710 |

It is seen that the later stage compressive strength was increased by about 18% while the air content and flow properties remained substantially unaffected. The admixture sample showed some set retardation.

What is claimed is:

1. An improved dry hydraulic cement comprising a mixture of hydraulic cement and from about 0.001 to 0.5 weight percent based on the weight of cement of at least one (dialkanol)aminomethyl phenol represented by the formula:

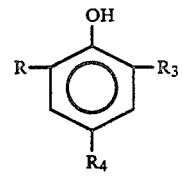

wherein R represents a (dialkanol)aminomethyl group of the formula $-CH_2NR_1R_2$ wherein $R_1$ and $R_2$ each represent a $C_2-C_5$ hydroxyalkyl group; $R_3$ represents hydrogen, hydroxyl, or R as defined above; and $R_4$ represents hydrogen, hydroxyl, R, sulfonyl as free acid or alkali or alkaline earth metal salt, a $C_1-C_3$ alkyl, a $C_1-C_3$ alkoxy or a nitro group.

2. The composition of claim 1 wherein the phenol is selected from the group consisting of o-(dialkanol)-aminomethyl-p-phenolsulfonic acid, o,o-bis[(dialkanol)- aminomethyl]-p-phenol sulfonic acid, their alkali or alkaline earth metal salts and mixtures thereof.

3. The composition of claim 1 wherein the phenol is selected from the group consisting of 2-[(dialkanol)-aminomethyl]-1,4-dihydroxybenzene 2,6-bis[(dialkanol) aminomethyl]-1,4-dihydroxybenzene and mixtures thereof.

4. The composition of claim 1 wherein the phenol is a (dialkanol)aminomethyl substituted catechol further having said (dialkanol)aminomethyl substitution group as $R_4$.

5. The composition of claim 1 wherein the phenol is a (dialkanol)aminomethyl substituted hydroquinone having said (dialkanol)aminomethyl bonded to at least one of the 2 or 6 position carbon atoms of the hydroquinone ring.

6. The composition of claim 1 wherein the phenol is present in from about 0.01 of 0.2 weight percent.

7. A hydraulic cement composition comprising a hydraulic cement and the compound of claim 1 with at least sufficient water for hydration of the cement.

8. The hydraulic cement composition of claim 7 wherein the composition further contains fine aggregate or a mixture of fine and coarse aggregate.

* * * * *